(12) United States Patent
Kodama

(10) Patent No.: US 6,417,844 B1
(45) Date of Patent: *Jul. 9, 2002

(54) DATA PROCESSING APPARATUS AND DATA PROCESSING METHOD

(75) Inventor: Yoshiyuki Kodama, Nagano-ken (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,531

(22) Filed: Jun. 24, 1997

(30) Foreign Application Priority Data

Jun. 25, 1996 (JP) .............................................. 8-164997

(51) Int. Cl.$^7$ ................................................ G09G 5/00
(52) U.S. Cl. ....................................... 345/173; 345/507
(58) Field of Search ................................. 345/173, 507, 345/508, 203, 525; 364/521; 340/799

(56) References Cited

U.S. PATENT DOCUMENTS

| | | | | |
|---|---|---|---|---|
| 4,484,302 A | * | 11/1984 | Cason et al. ................. | 364/900 |
| 4,755,810 A | * | 7/1988 | Knierim ..................... | 340/726 |
| 4,914,624 A | * | 4/1990 | Dunthorn .................... | 364/900 |
| 4,954,969 A | * | 9/1990 | Tsumura ..................... | 364/521 |
| 5,148,155 A | * | 9/1992 | Martin et al. ............... | 340/712 |
| 5,174,759 A | * | 12/1992 | Preston et al. .............. | 434/317 |
| 5,708,840 A | * | 1/1998 | Kikinis et al. .............. | 395/800 |
| 5,742,280 A | * | 4/1998 | Ohyama ...................... | 345/173 |
| 5,742,779 A | * | 4/1998 | Steele et al. ............... | 345/349 |
| 5,767,457 A | * | 6/1998 | Gerpheide et al. ............ | 178/18 |
| 5,844,547 A | * | 12/1998 | Minakuchi et al. ........... | 345/173 |
| 5,914,706 A | * | 6/1999 | Kono ........................ | 345/173 |

FOREIGN PATENT DOCUMENTS

| | | |
|---|---|---|
| JP | 6340933 | 2/1988 |
| JP | 2192381 | 7/1990 |
| JP | 4156791 | 5/1992 |
| JP | 5233125 | 9/1993 |
| JP | 7110822 | 4/1995 |

* cited by examiner

Primary Examiner—Vijay Shankar
Assistant Examiner—Vanel Frenel
(74) Attorney, Agent, or Firm—Hogan & Hartson, L.L.P.

(57) ABSTRACT

A plurality of different types of data that are optionally inputted by corresponding data input devices are treated as data associated with a single page. These data for each page are written at designated addresses in a flash memory 33. Then the plurality of different types of data associated with the page stored in the flash memory 33 are written in a display memory 50 for display as the data of the associated page. When the data are written in the display memory 50, a writing order is set for writing the data in the display memory 50 based on the types of data associated with the page that are stored in the flash memory 33. The data are successively written in the display memory 50 according to the order and then displayed.

4 Claims, 12 Drawing Sheets

DATA PROCESSING APPARATUS AND DATA PROCESSING METHOD

BACKGROUND OF THE INVENTION

The present invention relates to a data processing apparatus and a data processing method in which voice data, image data and character data are effectively inputted in a data processing apparatus, such as, for example, an electronic memo pad.

In recent years, portable type data collection apparatuses, such as electronic memo pads, have become popular. Some of the electronic memo pads recently developed not only function to record data that is written on a tablet screen by an input pen, but also are capable of capturing images and voices. The functions of these apparatuses are becoming more diversified and more convenient.

FIG. 13 schematically shows a structure of a conventional portable type data collection apparatus having functions to record information that is written on a tablet screen by an input pen as well as to input images and voices. The data collection apparatus includes a CPU 1, a ROM 2 that stores process programs, a data storage section 3 that stores collected data, an input and display integrated type tablet 6 that integrates a digitizer 4 and an LCD 5, an image input section 7, a voice input section 8, a voice output section 9, a data collection menu selection section 10 and a system bus 11 that connects each of the sections to the CPU 1.

From the structural point of view, the conventional portable type data collection apparatus of the type described above not only receives pen inputted data (ink data), such as, for example, characters and line images that are inputted through the tablet 6, but also receives image data and voice data.

However, when data is inputted in the conventional portable type data collection apparatus, a menu selection by the data collection menu selection section 10 must be performed. More specifically, modes must be set in accordance with the types of data to be inputted before the data is inputted. For example, the following steps are required for inputting an image and characters. First, an image input mode is set and then the image is inputted. Thereafter, for inputting characters by using the tablet, the mode is changed to a character input mode and then the characters are inputted.

In the use of the portable type data collection apparatus, it would be more convenient if the inputted image data, the voice data and the ink, or character, or pen input, data are handled as unit data in a unit of one page (herein referred to as page data). For example, when data for a product is recorded as data for one page (for one display), it would be convenient if an image of the product is inputted and an explanation for the image is added in the form of voice data or ink data that may be inputted through the pen input device. In this manner, it would be convenient to treat image data, voice data and ink data to be in one page as one page data.

Therefore, multimedia data including image data, voice data and ink data optionally inputted by a user may be stored in one page as page data. It would be desirable if such a data storage process is automatically performed without any operation by the user and without the user's awareness of the process.

However, the conventional portable type data collection apparatus does not automatically treat image data, voice data and ink data as page data in each page without operations by the user.

As described above, in the conventional portable type data collection apparatus, the mode setting operation must be performed for each type of data to be inputted, and thereafter data corresponding to the mode is inputted. Also, the inputted image data, voice data and ink data are not treated as page data for each page without the user's awareness of the process. Accordingly, there are inconveniences in the use of the apparatus and further improvements are required.

BRIEF SUMMARY OF THE INVENTION

In light of the above, it is an object of the present invention to provide a user-friendly data processing apparatus and a data processing method in which, when a plurality of different kinds, or types, of data including image data, voice data and ink data are inputted, a user need not set a mode for each type of data to be inputted, but may optionally input any of the data without restriction.

The above and other objects are achieved, according to the present invention, by a data processing apparatus for collecting and displaying inputted data and storing the inputted data, the apparatus comprising: a memory device that stores data optionally inputted to be displayed in a common display area, the data being stored as mutually associated data; and a display device that displays the mutually associated data as display data in the display area opened on a display screen.

The data optionally inputted to be displayed in the common display area may include at least two of image data, sound data and character and line image data. Alternatively, the data optionally inputted to be displayed in the common display area may include all three of the image data, sound data and character and line image data.

Objects according to the invention are further achieved by a data processing apparatus for collecting and displaying inputted data and storing the inputted data, the apparatus comprising: data input devices that input a plurality of different kinds of data; a data storage device that stores data optionally inputted to be displayed in a common display area, the data being stored as mutually associated data in designated addresses; a display storage device that stores the data stored in the data storage device as display data to be displayed in the display area opened on a display screen; and a control device that controls each of the devices, wherein when the plurality of the associated different kinds of data stored in the data storage device are written in the display storage device as the display data to be displayed in the display area opened on the display screen, a writing order is set for the different kinds of inputted data and the different kinds of data are successively stored in the display storage device and displayed according to the writing order.

The data input devices for inputting a plurality of different kinds of data can include at least two of an input and display integrated type tablet for inputting character and line image data and displaying the inputted data upon: touching the display area; an image input device for inputting images; and a sound input device for inputting sounds, wherein at least two of the character and line image data, the image data and the sound data that are inputted by the data input devices are treated as the associated data.

The data input devices for inputting a plurality of different kinds of data include an input and display integrated type tablet for inputting character and line image data and displaying the inputted data upon touching the display area, an image input device for inputting images and a sound input device for inputting sounds, wherein the character and line image data, the image data and the sound data that are inputted by the three data input devices are treated as the associated data.

In the process of successively writing the different kinds of inputted data in the display storage device according to the designated order, data that is set later in the order is written over data that has been written earlier.

The associated data to be displayed on the common display area are inputted in each page.

Objects according to the invention are further achieved by a data processing apparatus for collecting and displaying inputted data and storing the inputted data, the apparatus comprising: data input devices that input a plurality of different kinds of data; a data storage device that stores data optionally inputted to be displayed in a common display area, the data being stored as mutually associated data in designated addresses; a display storage device that stores the data stored in the data storage device as display data to be displayed in the display area opened on a display screen; an erasing device that erases the inputted data; and a control device that controls each of the devices, wherein when the plurality of the associated different kinds of data stored in the data storage device are written in the display storage device as the display data to be displayed in the display area opened on the display screen, a writing order is set for the different kinds of inputted data and the different kinds of data are successively stored in the display storage device and displayed according to the order, and when the inputted data is erased, the erasing device is operated so that any desired one of the inputted data to be displayed in the common display area is erased.

Two erasing devices are provided. When one of the erasing devices is operated, only a designated one of the inputted data to be displayed on the common display area is erased, and when both of the erasing devices are operated, all of the inputted data to be displayed in the common display area are erased.

Objects according to the invention are further achieved by a data processing method for collecting and displaying inputted data and storing the inputted data, the method comprising the steps of: treating data optionally inputted to be displayed in a common display area as mutually associated data; and displaying the mutually associated data as display data in the display area opened on a display screen.

The data optionally inputted to be displayed on the common display area include at least two of image data, sound data and character and line image data. Alternatively, the data optionally inputted to be displayed in the common display area may include all three of the image data, sound data, and character and line image data.

Objects according to the invention are further achieved by a data processing method for collecting and displaying inputted data and storing the inputted data, the method comprising the steps of: storing data optionally inputted to be displayed in a common display area as mutually associated data at designated addresses in a data storage device; and then writing in a display storage device the plurality of the associated different kinds of data in the data storage device as display data to be displayed in the common display area, wherein, when writing the data in the display storage device, a writing order is set for writing in the display storage device the associated data stored in the data storage device, and the associated data are successively stored in the display storage device and displayed according to the order.

The data optionally inputted to be displayed in the common display area include at least two of image data, sound data and character and line image data.

The data optionally inputted to be displayed on the common display area may include all three of the image data, sound data, and character and line image data.

In the process of successively writing the different kinds of inputted data in the display storage device according to the designated order, data that is set later in the order is written over data that has been written earlier.

The associated data to be displayed on the common display area are inputted in each page.

Objects according to the invention are further achieved by a data processing method for collecting and displaying inputted data and storing the inputted data, the method comprising the steps of: storing data optionally inputted to be displayed in a common display area as mutually associated data at designated addresses in a data storage device; thereafter writing in a display storage device the plurality of the associated different kinds of data stored in the data storage device as display data to be displayed in the display area opened on a display screen, wherein, when writing the data in the display storage device, a writing order is set for writing in the display storage device the associated data stored in the data storage device, and the associated data are successively stored in the display storage device according to the order for displaying the data; and providing an erasing device for erasing the inputted data, wherein, when the data is erased, the erasing device is operated so that any desired one of the inputted data to be displayed on the common display area is erased.

Two erasing devices are provided. When one of the erasing devices is operated, only a designated one of the inputted data to be displayed in the common display area is erased, and when both of the erasing devices are operated, all of the inputted data to be displayed on the common display area are erased.

As a result of using the means described above, when a plurality of multimedia data including image data, ink data and voice data are inputted as data in one page, different modes do not have to be set for the different data inputted. Any of the data can be inputted optionally as the user wishes, and the inputted data can be displayed as data in one page.

In erasing data that is displayed in one page, only a selected one of the displayed data, or the entire data on that page can be erased with a relatively simple operation. In particular, a pen is used to erase a part of the displayed data by touching the part with the pen or moving the pen over the part. As a result, erasing the data can be performed as though a memo written by a pencil is erased by a rubber eraser. Accordingly, the user-friendliness of the electronic memo pad is improved.

DETAILED DESCRIPTION OF THE INVENTION

Embodiments of the present invention will be described below. In those embodiments, the present invention is implemented in an electronic memo pad, which is a portable type data collection apparatus.

Figure 1:
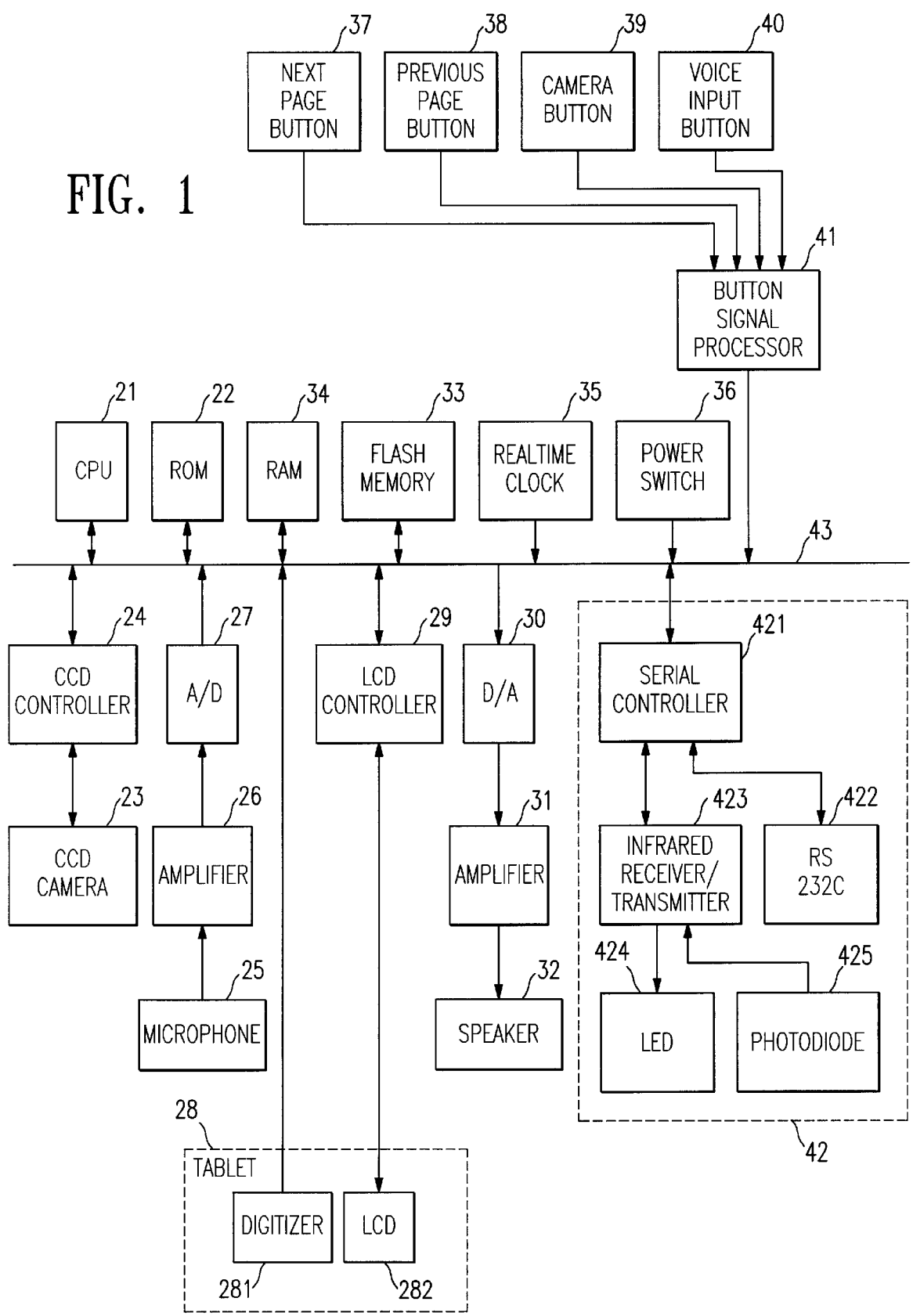
FIG. 1 shows a block diagram of apparatus in accordance with an embodiment of the present invention.

FIG. 1 shows a block diagram representing the overall structure of an electronic memo pad in accordance with an embodiment of the present invention.

The electronic memo pad includes a CPU 21 and a ROM 22 that stores a basic processing program for the electronic memo pad and a data collection processing program in accordance with the present invention (process steps according to the data collection processing program will be described in detail later), as well as data required for the processing. The electronic memo pad further includes a CCD camera 23 that received image data, a CCD controller 24 that drives the CCD camera 23 and converts a signal from the CCD camera 23 to a digital signal, a microphone 25 that receives voice data, an amplifier 26 that amplifies a voice signal from the microphone 25, an A/D converter 27 that converts the voice signal to a digital signal, and an input and display integrated type tablet 28 that receives character data and line image data and displays the inputted data. Tablet 28 is composed of a digitizer 281 and a liquid crystal display section 282. The electronic memo pad also includes a liquid crystal display section (LCD) controller 29, a D/A converter section 30 that converts the voice signal to an analog signal for outputting the voice signal, an amplifier 31, a loudspeaker 32, a flash memory 33 that defines a data storage device for storing data inputted by the user (the data stored in the flash memory and storage areas of the data will be described in detail later), a RAM 34 that defines a work, memory which is used when a variety of processes for the electronic memo pad are executed, a real time clock 35 that measures the current time and outputs time data and date data, a power switch 36, page changing buttons including a next page button 37 and a previous page button 38, a camera button 39, a voice input button 40, a button signal processing section 41 that detects ON and OFF states of the buttons including two erasing buttons 44a and 44b, for erasing inputted data, whose function will be described later, and outputs signals in response to the detected ON and OFF states, an external equipment connecting section 42 that transmits and receives data between the electronic memo pad and other data processing apparatus such as a personal computer, a system bus 43 that connects the sections and devices, and a display memory (VRAM) 50 that writes contents to be displayed on the LCD 282.

The external equipment connecting section 42 includes a serial controller 421, an RS232C port 422 that is used as an interface for connecting to a data processing equipment such as a personal computer, an infrared receiver and transmitter 423 that performs photo-communication with a data processing equipment such as a personal computer, a light emitting diode (LED) 424, and a photo diode 425.

Figure 2:
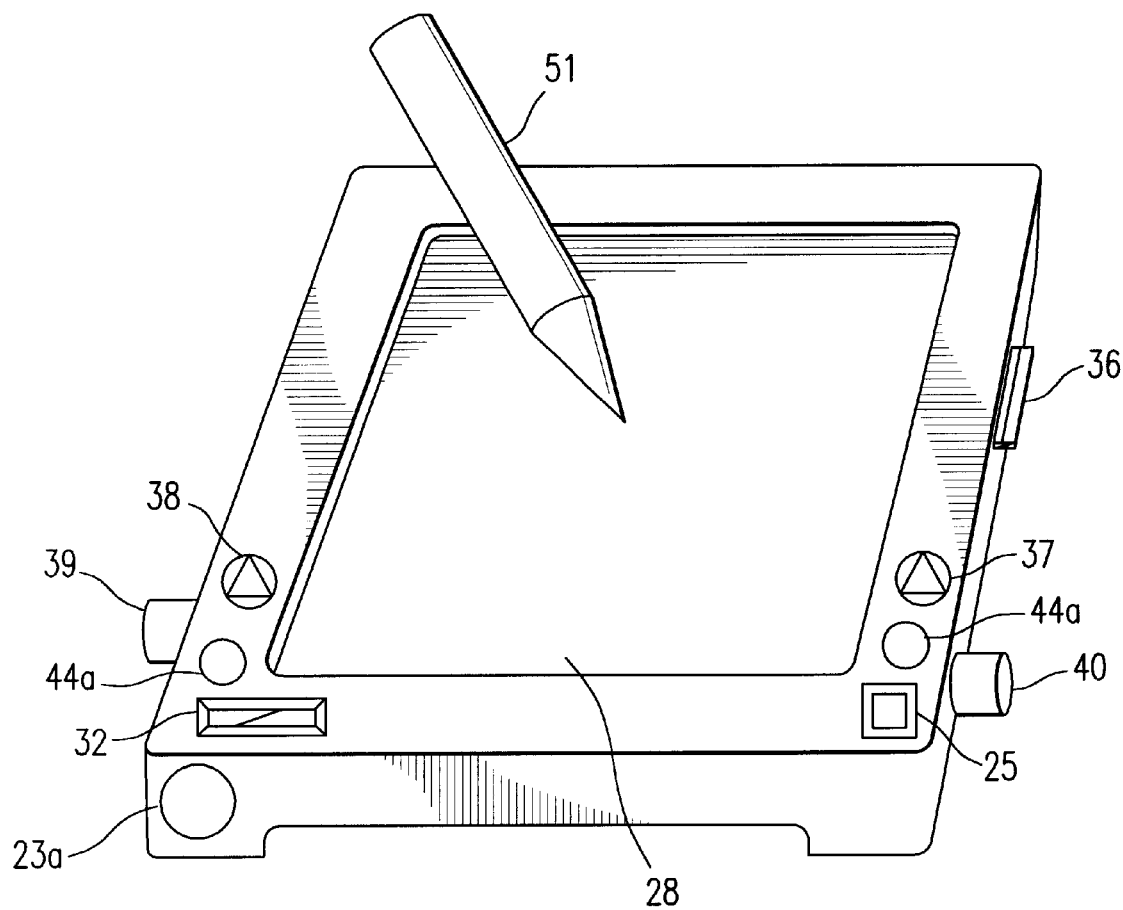
FIG. 2 shows a perspective view of the exterior of an electronic memo pad in accordance with an embodiment of the present invention.

FIG. 2 shows the exterior structure of the electronic memo pad in accordance with the present invention. Components corresponding to those shown in FIG. 1 are designated by the same reference numerals in FIG. 1. The components of FIG. 1 that appear on the exterior of the memo pad include the CCD camera 23 (in effect, a lens 23a of the CCD camera 23), the camera button 39, the tablet 28, the microphone 25, the loudspeaker 32, the voice input button 40, the next page button 37, the previous page button 38, the power switch 36, and the erasing buttons 44a and 44b. Reference numeral 51 denotes an input pen for writing characters, drawing line images and pointing to icons on the screen of the tablet 28. As shown in FIG. 2, the erasing buttons 44a and 44b are provided adjacent the right and left side ends of the apparatus, respectively.

According to the structure described above, when characters are written or line images are drawn on the display of the tablet 28 by the input pen 51, the internally mounted CPU 21 reads coordinates provided by the digitizer 281, displays traced lines at corresponding locations on the display screen (LCD 282) of the tablet 28, and stores coordinate data in a specified address region in the flash memory 33.

For inputting an image by the CCD camera 23, the lens 23a of the CCD camera 23 is directed to the scene or object for which an image is to be inputted. When the camera button 39 is first depressed halfway, the image inputted through the lens 23a is displayed on the screen of the tablet 28 as a moving picture. Then, when the camera button 39 is further depressed, the displayed image is locked, or frozen, and the locked image is captured. An image signal of the image is converted to a digital signal by the CCD camera controller 24, and stored at a specified address in the flash memory 33.

For inputting a voice, i.e. speech or sound, the voice input button 40 is depressed so that the sound is picked up by the microphone 25. The sound is amplified by the amplifier 266, converted to a digital signal by the A/D converter 27 and stored at a specified address in the flash memory 33. It is noted that the term voice generally means sound that is produced by human beings, and the embodiment herein is described with reference to voices. However, it should be noted that the present invention covers all sounds that can be collected including not only human voice but also musical sounds and sounds in nature.

The respective inputted data are, in effect, compressed first and then stored in the flash memory 33. For example, the coordinate data is transferred to the RAM 34, and successively compressed by the CPU 21 in the order in which the data is inputted. The compressed coordinate data is then stored in the flash memory 33. When the data stored in the flash memory 33 is displayed, the data is transferred to the RAM 34, decompressed by the CPU 21 and displayed on the LCD 282. The image data and the voice data are likewise compressed and stored in the flash memory 33. For displaying the data stored in the flash memory 33, the data is first decompressed and displayed on the LCD 282 (through the loudspeaker in case of the voice data).

The above described data is inputted in a unit of one display screen (for each individual page). A process thereof will be described hereunder.

When the power switch 36 is turned on at a time when the electronic memo pad is to be used, the display screen (LCD 282) of the tablet 28 shows a blank page (this page is defined as a first page). The present embodiment will be described with reference to a case in which some data has already been inputted in the first page and new data is to be inputted in a second page and pages thereafter.

In the present example, a user of the electronic memo pad is. having a business meeting with a person whom the user has met for the first time. Personal information about the person, contents of the meeting, and information about the products being dealt with in the meeting are inputted in the electronic memo pad.

Figure 3A:
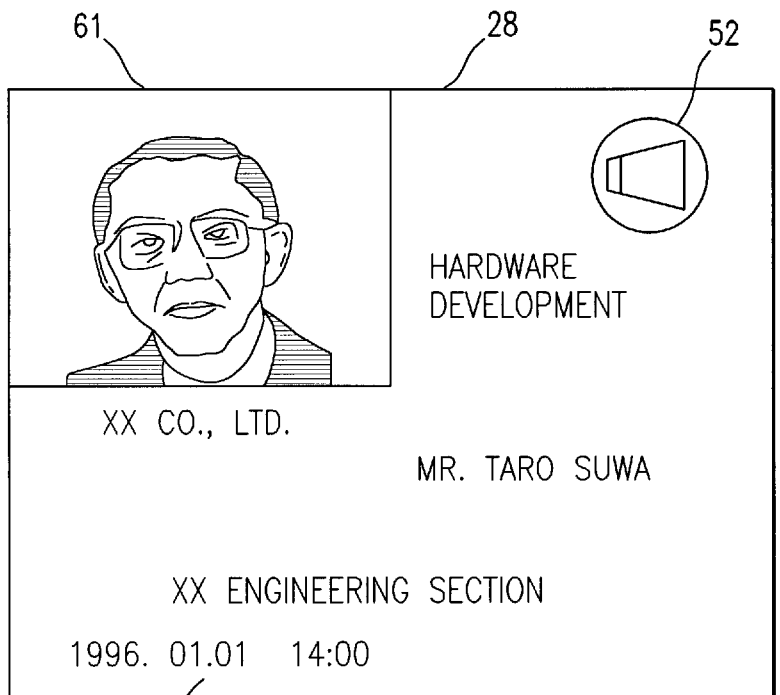
FIGS. 3a and 3b shows displays representative of data inputted in an electronic memo pad in accordance with an embodiment of the present invention.

When the user turns on the power switch 36, the first page that contains the data is first displayed. When the next page button 37 is depressed, the second page in which no data has been inputted is displayed. In this state, the user may input an image of the face of the person. The user points the lens 23a of the CCD camera 23 toward the person, and depresses the camera button 39 halfway as described above. As the user further depresses the camera button 39, am image of the person's face (a still image) at the moment is captured, and displayed on the display screen of the tablet 28 as shown in FIG. 3a. At the same time, the image data is stored in a specified address in the flash memory 33. The size and the location of a display area for displaying the image, with respect to the entire display area of the display screen of the tablet 28, may be set in advance. Alternatively, they can be set each time an image is displayed as required.

Figure 3B:
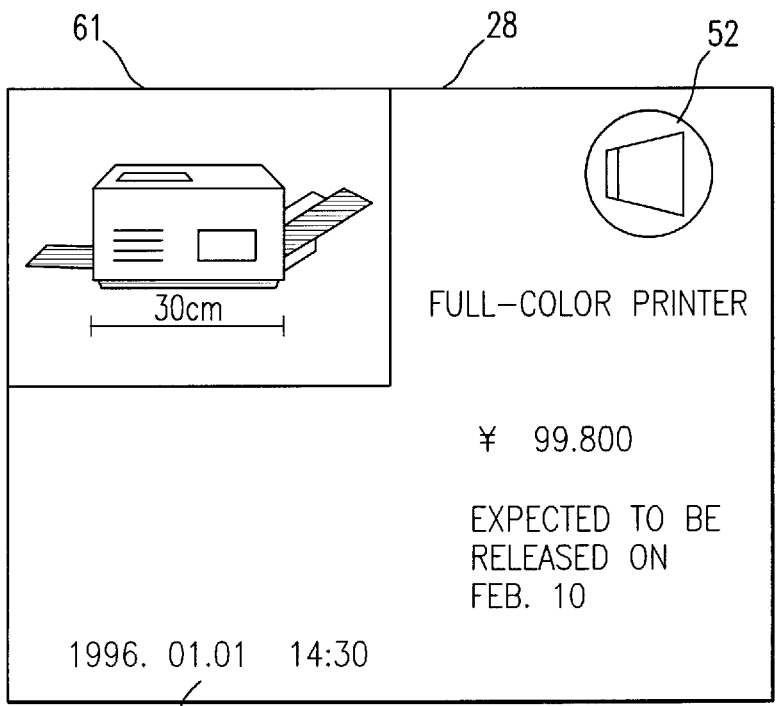

FIGS. 3a and 3b show an embodiment in which the upper left portion, equal to approximately one quarter of the display screen, is used as an image area.

As to the personal information about the person in the meeting, the user of the electronic memo pad inputs data for the name of the person, the name of the company, the person's department or section and the like, with the input pen 51 in the form of characters or line images as he feels necessary. Data for the characters and the line images inputted by the input pen 51, defined as ink data, is displayed on the display screen of the tablet 28, in the same form as drawn or written by the user, and is also stored at a specified address in the flash memory 33.

Also, for example, when an important portion of the meeting is to be recorded as voice data, the voice input button 40 is depressed. Speech occurring at the moment is inputted, converted to a digital signal and stored as a voice signal at a specified address in the flash memory 33. When the voice input is completed, an icon 52 indicating that the voice has been recorded is displayed at a specified location on the display screen of the tablet 28. In one embodiment, the icon 52 is also used to trigger a voice read-out function. In other words, when the data of this page is read out at a later time, the input pen 51 can be pointed to the icon 52 to read out and reproduce the voice data from the specified address in the flash memory 33.

FIG. 3a shows an embodiment in which the data inputted by the process performed in the manner described above is displayed on the display screen of the tablet 28 (as data in the second page). As shown in FIG. 3a, face image data 61, ink data 62 representative of inputted characters and lines, and the icon 52 indicating that voice data is included in the inputted data are visually displayed as page data in the unit on one page. As described above, when the input pen 51 points to the icon 52, the voice data is read out from the specified address and outputted, or reproduced, through the loudspeaker 32.

In addition to the data described above, data for the current date and time is transmitted from the real time clock 35 and automatically displayed. The data for the current date and time is stored at a specified address in the flash memory 33 as data to be added to the page. When the page data is read out at a later time, the date and the time when the data is inputted will be displayed, based on the data for the current date and time.

When the data collection is completed for the page (second page) in which the data is currently inputted, and different information is to be inputted in another page (third page), the next page button 37 is depressed. The following page (third page) is opened as a new page and new information can be inputted in the third page.

Data storage regions of the flash memory 33 in which the above-described data is written will be described later.

FIG. 3b shows data written in the third page in accordance with an embodiment of the present invention. In the illustrated embodiment, an image of a product 63 is inputted as image data, a memo containing the name and features (for example, the price and general performance) of the product is written, and voice data that adds description of the product (for example, "This product is scheduled to be on sale for so and so month and date.") is inputted. In this embodiment, the icon 52 is also displayed to indicate that voice data has been inputted.

In the manner described above, data can be inputted in different pages in a unit of one page.

Figure 4:
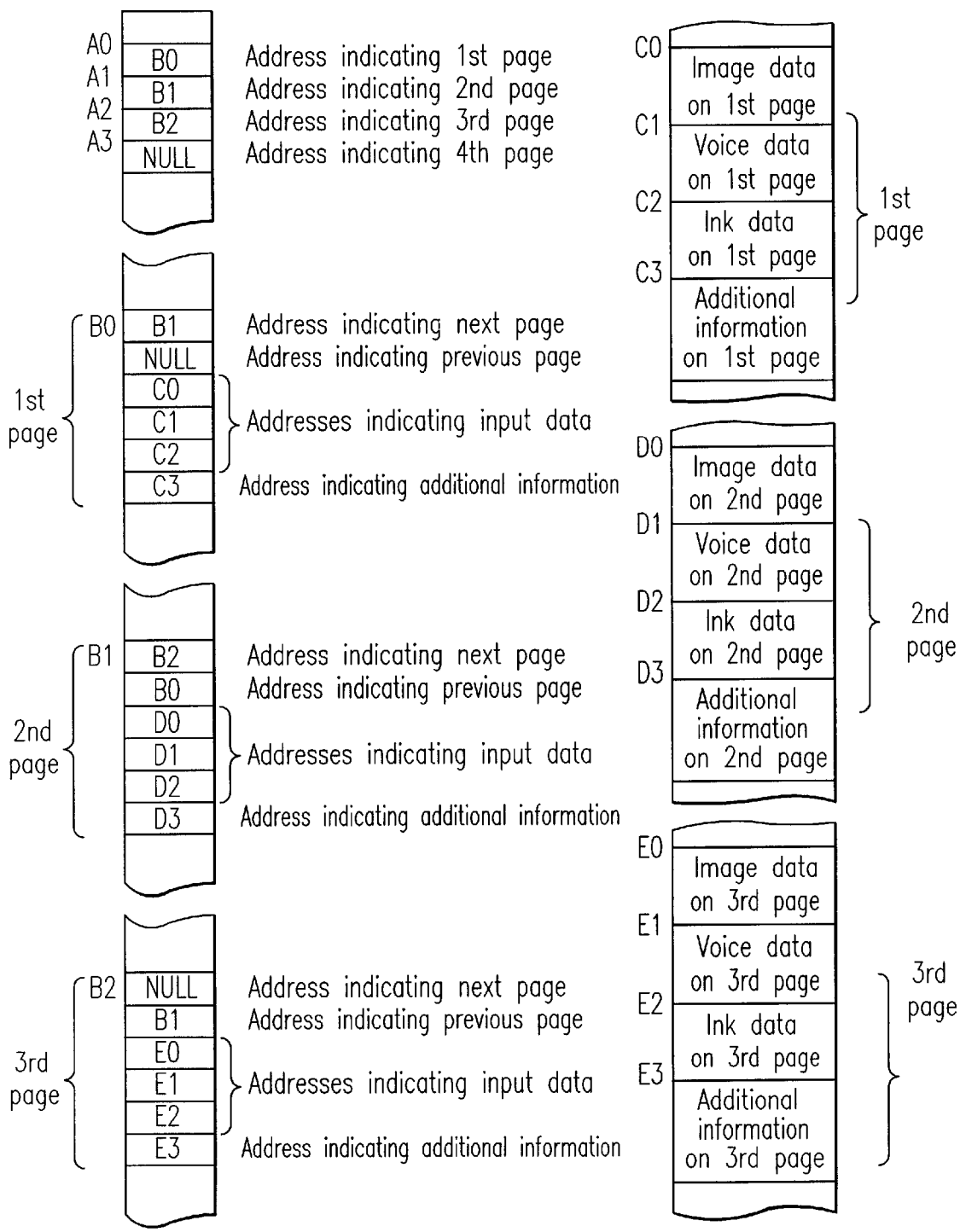
FIG. 4 shows contents of a flash memory in accordance with an embodiment of the present invention.

FIG. 4 shows contents in the flash memory 33 when the above-described data input process is performed in accordance with an embodiment of the present invention. FIG. 4 shows contents stored in the memory for a page (which is defined as a third page) in which data is currently inputted, a previous page (which is defined as a second page) and a page previous to the previous page (which is defined as a first page). The data structure will be described below with reference to FIG. 4.

In FIG. 4, the addresses of the pages that store the inputted data are written at addresses A0, A1, A2, . . . .

For simplicity of explanation, let us assume that a page in which data is first inputted is defined as a first page, a page in which data is inputted next is defined as a second page, a page in which data is currently inputted is defined as a third page, and there is no data inputted in pages after the third page.

In FIG. 4, addresses A0, A1, A2, . . . define page address regions that contain addresses of the respective pages in which the data is inputted. At address A0, address B0 is written as an address at which data for the first page is stored. At address A1, address B1 is written as an address at which data for the second page is stored. At address A2, address B2 is written as an address at which data for the third page is stored.

Addresses B0, B1, B2, . . . define page content indication address regions in which addresses indicative of regions that store data relating to the respective pages are stored. At address B0 at which the data for the first page is stored, address B1 is written as an address which data for the next page (in this case, the second page) is stored, address "NULL" is written as an address at which data for the previous page is stored ("NULL" indicates "nothing" and therefore indicates that the first page is the starting page), addresses C0, C1 and C2 are written as addresses at which the data inputted in the first page is stored, respectively, and address C3 is written as an address at which page additional data for the first page is stored.

At address B1 at which the data for the second page is stored, address B2 is written as an address at which the data for the next page (in this case, the third page) is stored, address B0 is written as an address at which data for the previous page in this case, the first page) is stored, addresses D0, D1 and D2 are written as addresses at which the data inputted in the second page is stored, respectively, and address D3 is written as an address at which page additional data for the second page is stored.

At address B2 at which the data for the third page (the page in which the data is currently inputted) is stored, address "NULL" is written as an address at which the data for the next page (indicating that the third page is the last page) is stored, address B1 is written as an address at which the data for the previous page (in this case, the second page) is stored, addresses E0, E1 and E2 are written as addresses at which the data inputted in the third page is stored, respectively, and address E3 is written as an address at which page additional data for the third page is stored.

The image data for the first page is stored at address C0, the ink data for the first page is stored at address C1, and the voice data for the first page is stored at address C2. The image data for the second page is stored at address D0, the ink data for the second page is stored at address D1, and the voice data for the second page is stored at address D2. Also, the image data for the third page is stored at address E0, the ink data for the third page is stored at address E1 and the voice data for the third page is stored at address E2. Further, in addition to the above-described inputted data, additional data for each page (as described, above, date and time data in the present embodiment) is stored at address C3 for the first page, at address D3 for the second page and at address E3 for the third page.

In the embodiment shown in FIG. 4, a variety of data sets (image data, voice data, ink data and the like) are stored in the flash memory in an orderly fashion in the units of one page. However, locations at which the inputted data sets are written are designated by addresses at which the inputted data are stored for each page (C0, C1, . . . , D0, D1, . . . E0, E1, . . . ), and the data sets are not necessarily stored at successive addresses for each page. For example, the image data for the first page may be designated by address C0, the voice data for the first page may be designated by address D2, the ink data for the first page may be designated by address E1, the image data for the second page may be designated by address C1, the ink data for the second page may be designated by address E0, and the voice data for the second page may be designated by C2. In this manner, these data sets are written at any designated addresses.

It is noted that the data indicative of the addresses of the respective pages written at addresses B0, B1 and B2 have a bi-directional list structure, so that head addresses of associated pages (in this case, the previous page and the next page) can be mutually designated.

For example, address B2 is written at address B1 (for the second page) as an address indicative of the next page. It is noted that address B2 is a head address of a region that stores the data for the third page. Also, address B0 is written at address B1 (for the second page) as an address indicative of the previous page. It is noted that address B0 is a head address of a region that stores the data for the first page.

In a similar manner, address B1 is written at address B2 (for the third page) as an address indicative of the previous page, and the address B1 is a head address of a region that stores the data for the second page. In this manner, the head addresses of the previous page and the next page can be mutually designated.

The above-described list structure can readily accommodate deletion and insertion of pages. For example, when the second page is deleted, the first page can designate the head address of the third page as the next page, and the third page can designate the head address of the first page as the previous page. Accordingly, the present list structure is convenient when data is deleted and inserted.

In the manner described above, the data inputted for each page is written in the flash memory 33.

It is noted that the image data and the ink data for the second page are shown in FIG. 3a in accordance with an embodiment of the present invention, and the image data and the ink data for the third page are shown in FIG. 3b in accordance with an embodiment of the present invention. The voice data is representative of voice data that is inputted, for example, as a supplemental explanation for the inputted image data or the like, and the icon 52 is displayed in each of the embodiments to indicate that the voice data has been inputted.

As described above, in accordance with the present invention, a variety of data sets can be inputted in each page. Image data, ink data and voice data are inputted optionally as the user wishes without performing a menu selection, in other words, without changing the mode. More specifically, when an image input is completed, characters or lines may be immediately inputted by the input pen 51, and speech may be further inputted. In this manner, different information can be inputted optionally as the information occurs to the user. It is noted that when a variety of different data sets are inputted, the different data sets can be inputted in any order. Also, not all of the different types of data are necessarily inputted, and only required data may be inputted depending upon a particular situation. For example, only image data and ink data, only voice data and ink data, only ink data, or only image data may be inputted.

In the prior art, for inputting an image, an image input mode is first set and then the image is inputted. For inputting data by an input pen, an input pen mode is set and then the data is inputted by the input pen. In this manner, a different mode is first set and thereafter data corresponding to the set mode is inputted.

As described above, in accordance with the present invention, image data, ink data and voice data are inputted in each page optionally as the user desires without performing a menu selection and the inputted data is displayed. They are the key points of the present invention. To attain these points, image data, ink data and voice data that are inputted as data in one page are treated as data associated with that page, and further, the following process is performed.

Figure 5:
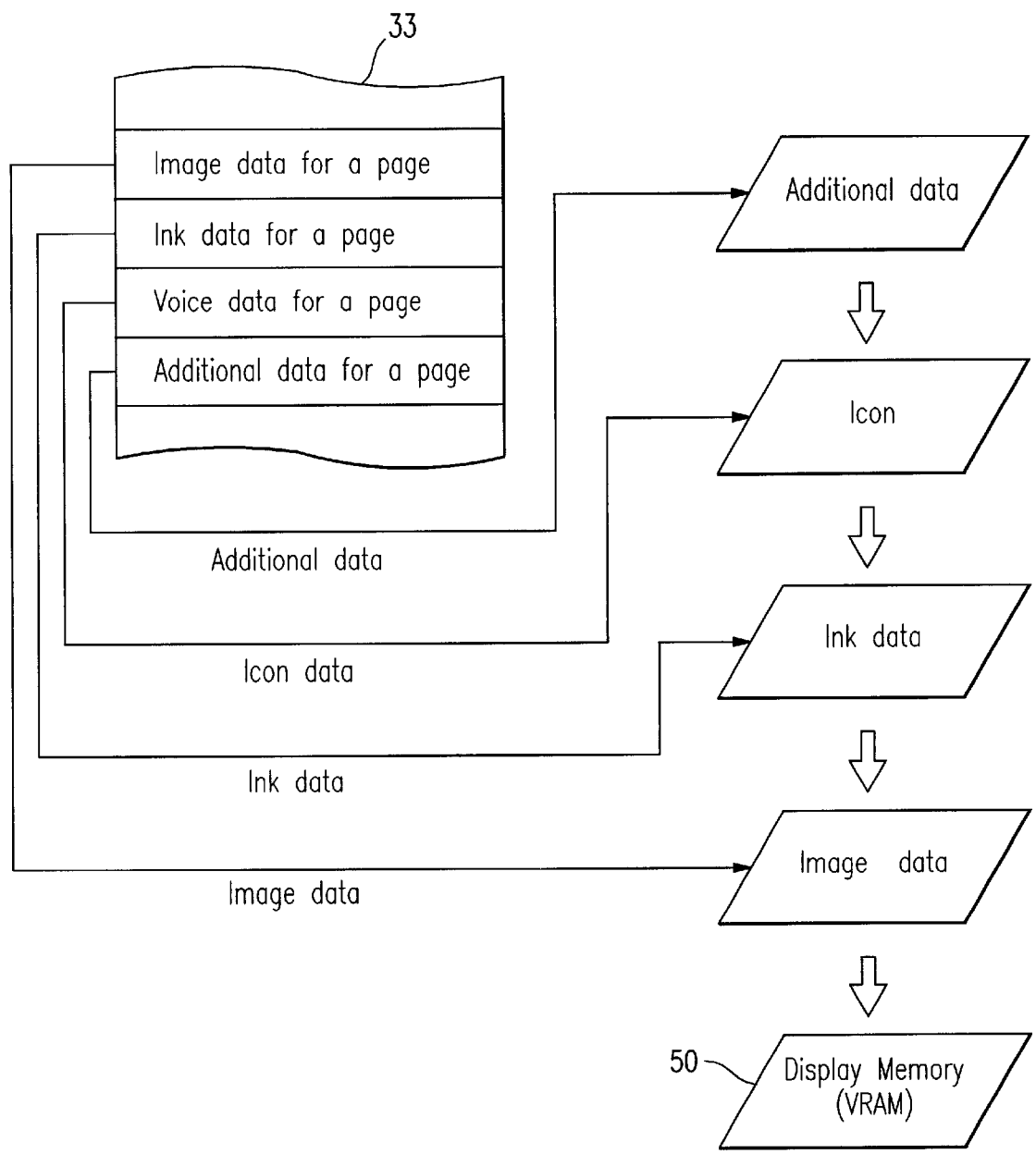
FIG. 5 illustrates a process of writing data from a flash memory to a display memory (VRAM) in accordance with an embodiment of the present invention.

FIG. 5 shows a manner in which data associated with one page stored in the flash memory 33 are written in the display memory (VRAM) 50. As shown in FIG. 5, image data, voice data, ink data and additional data inputted in one page are written as data associated with the page at specified addresses in the flash memory 33.

For example, let us assume a case when a user first inputs an image, then inputs a memo relating to the inputted image, and further inputs a spoken statement. Image data for the image, ink data for the memo, voice data for the voice and additional data for the date and the time are written each at specified addresses allocated to one page in the flash memory 33. Then, the written data are read out and transferred to the RAM 34. After the CPU 31 executes a specified data processing on the data, the data are written at specified addresses of the display memory 50 and displayed on the display screen of the tablet 28.

As shown in FIG. 5, the data are written in the display memory 50 in layers. First, the image data is written at a specified address in the display memory 50. Then, the ink data is written at the specified address in the display memory 50. Then, the voice data (icon data indicating that the voice data is inputted in accordance with the present embodiment) is written at the specified address in the display memory 50. Further, the additional data is written at the specified address in the display memory 50. In this manner, the different data are written in layers in a predetermined order.

Figure 6A:
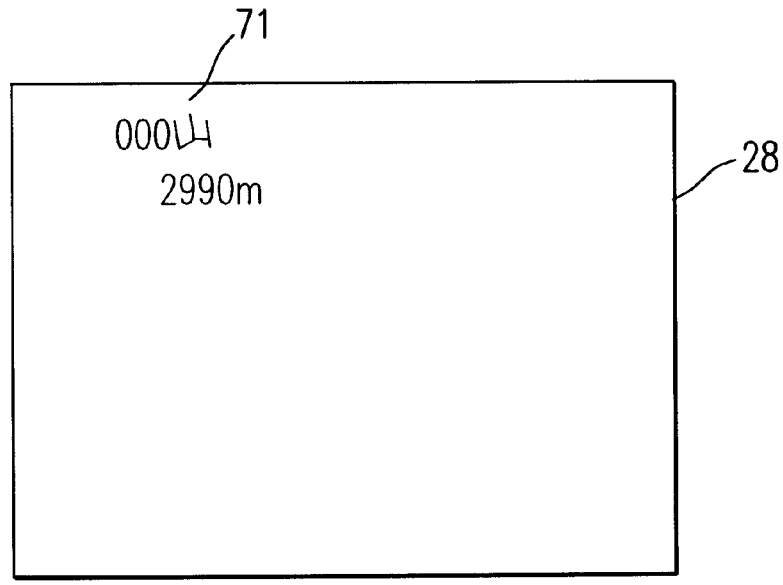
FIGS. 6a and 6b shows displays when two types of data are written in a display memory (VRAM) one on top of the other in accordance with an embodiment of the present invention.
Figure 6B:
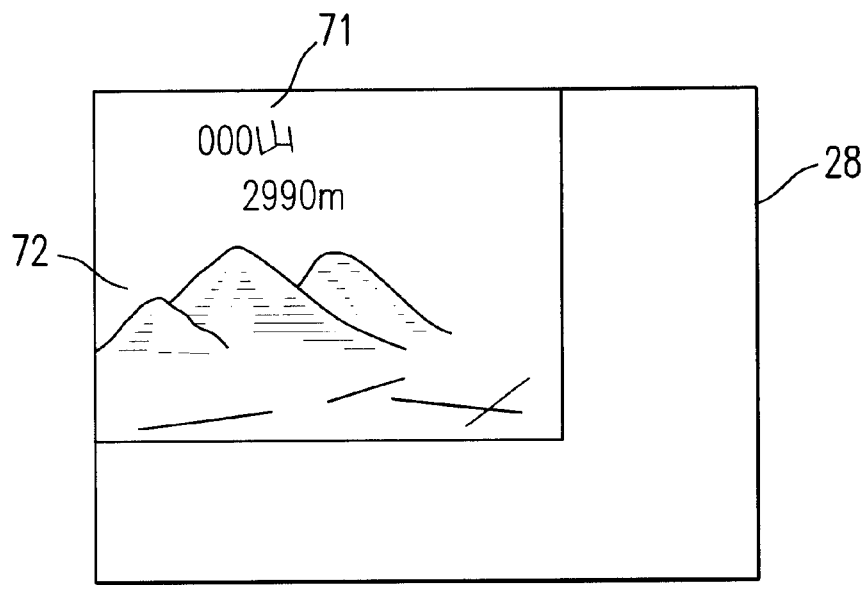

FIGS. 6a and 6b show an example where an image is inputted in a page in which ink data 71 has already been inputted. FIG. 6a shows a state in which the ink data 71 that has already been inputted is displayed on the display screen of the tablet 28. When an image is inputted in the same page, the lens 23a of the CCD camera 23 is directed to an imaging object, the camera button 39 is first depressed halfway, and then the camera button 39 is fully depressed. When the camera button 39 is depressed halfway, the CPU 21 controls the CCD controller 24 so that an image of the object is inputted through the CCD camera 23, image data for the image is temporarily stored in the RAM 34. Then the CPU 21 performs a color conversion of the image and drives the LCD controller 29 to display the color converted image on the display screen of the tablet 28 for monitoring. As the user further depresses the camera button 39, while looking at the image on the display screen, the image data at this moment is transferred to the RAM 34, and then written in the flash memory 33 at a specified address associated with the page. The written data is read out from the flash memory 33 and written in the display memory 50 so that the data is displayed on the display screen of the tablet 28.

From the viewpoint of the relationship of positions of the image to be displayed on the display screen of the tablet 28 and the ink data 71 that has already been written, it appears that the image data would be displayed over the ink data. However, in this case, the data is written in the display memory 50 in the following order. First, the image data is read out from the flash memory 33 and written in the display memory 50. Then, the ink data is read out from the flash memory 33 and written in the display memory 50. Because the data are written in this order, the ink data 71 is written over the image 72 so that a display on the display screen after the image is inputted appears to be the one shown in FIG. 6b. In other words, the ink data in this case is redisplayed with respect to the ink data 71 that has already been displayed.

It is noted that, with respect to the ink data that has already been written in the display memory 50, the ink data is read out from the flash memory and written in the display memory 50 again (the ink data is renewed) to renew the display. Renewing the display is defined herein as redisplaying.

In the opposite case to the one described with reference to FIGS. 6, where image data is displayed on a page as an initial state and ink data is written over the image data, the image data is first read out from the flash memory 33 and written in the display memory 50, and then the ink data is read out from the flash memory 33 and written in the display memory 50. As a result, a display on the display screen, after redisplaying, is in a state in which the ink data is written over the image data. When icon data and additional data are also present in the same page, the image data, the ink data, the icon data and the additional data are written in the display memory 50 in this order. Therefore, when ink data is written at the same location where icon data and additional data are present, a display on the display screen, after redisplaying, is in a state in which the icon data and the additional data are written over the ink data. In other words, when the icon data and the additional data are already displayed on the same page and the ink data is written over the icon data and the additional data, and when the input pen moves over the icon data or the additional data while the ink data is inputted, these data are redisplayed in the order of the data layers described above after the input pen is lifted up. Accordingly, a display after redisplaying is in a state in which the icon data and the additional data are written over the ink data.

It should be noted that the order of the data layers is not limited to the above described embodiment. For example, ink data may be placed in the first layer. In an alternative embodiment, data in forward layers with respect to the currently inputted data need not be redisplayed, and only data whose writing order are set in lower layers with respect to the currently inputted data may be redisplayed. For example, when image data, icon data and additional data are already present, and thereafter ink data is written, only the icon data and the additional data may be redisplayed.

Figure 7:
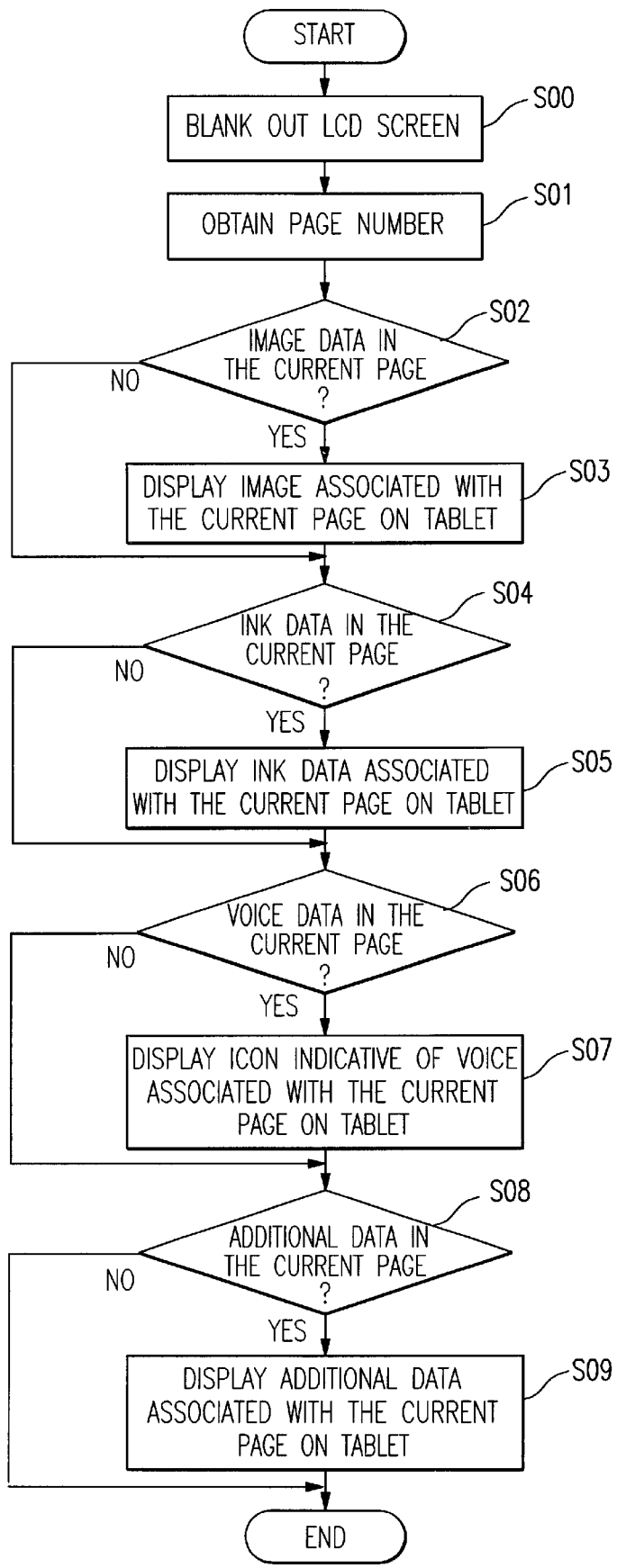
FIG. 7 is a flow chart of a redisplay process in accordance with an embodiment of the invention.

FIG. 7 shows a flow chart of the steps of the above-described redisplaying process. First, the entire area of the current page is blanked out (step S00), and a page number of a page to be processed is obtained (step S01). A determination is made as to whether or not the page (to be defined as the current page) contains image data (step S02). When no image data is present, a determination is made as to whether or not the page contains ink data. However, when a determination is made in step S02 that image data is present, the image data associated with the current page is read out from the flash memory 33, transferred to the RAM 34, processed by the CPU 21 to change the image size and the like, and written at a specified address in the display memory 50, so that the image data is displayed on the display screen of the tablet 28 (step S03).

Next, a determination is made as to whether or not ink data is present (step S04). When no ink data is present, a determination is made as to whether or not voice data is present. However, when a determination is made in step S04 that ink data is present, the ink data associated with the current page is read out from the flash memory 33, transferred to the RAM 34, processed by the CPU 21 to convert its vector data to bit map data and the like, and written at a specified address in the display memory 50, so that the ink data is displayed on the display screen of the tablet 28 (step S05).

Then, a determination is made as to whether or not voice data is present (step S06). When no voice data is present, a determination is made as to whether nor not additional data is present. However, when a determination is made in step S06 that voice data is present, the voice data associated with the current page is read our from the flash memory 33, and transferred to the RAM 34. Then icon data indicating the presence of voice data is written at a specified address in the display memory 50, so that an icon indicating the presence of the voice data is displayed on the display screen of the tablet 28 (step S07).

Lastly, a determination is made as to whether or not additional data is present (step S08). When no additional data is present, the process is completed. However, when additional data is present, the additional data associated with the current page is read out from the flash memory 33, and transferred to the RAM 34. Then, the additional data is written at a specified address in the display memory 50, so that the additional data is displayed on the display screen of the tablet 28 (step S09).

FIGS. 8–12 shows flow charts of an overall data collection process performed by the above-described electronic memo pad in accordance with the present invention. The process will be described below.

Figure 8:
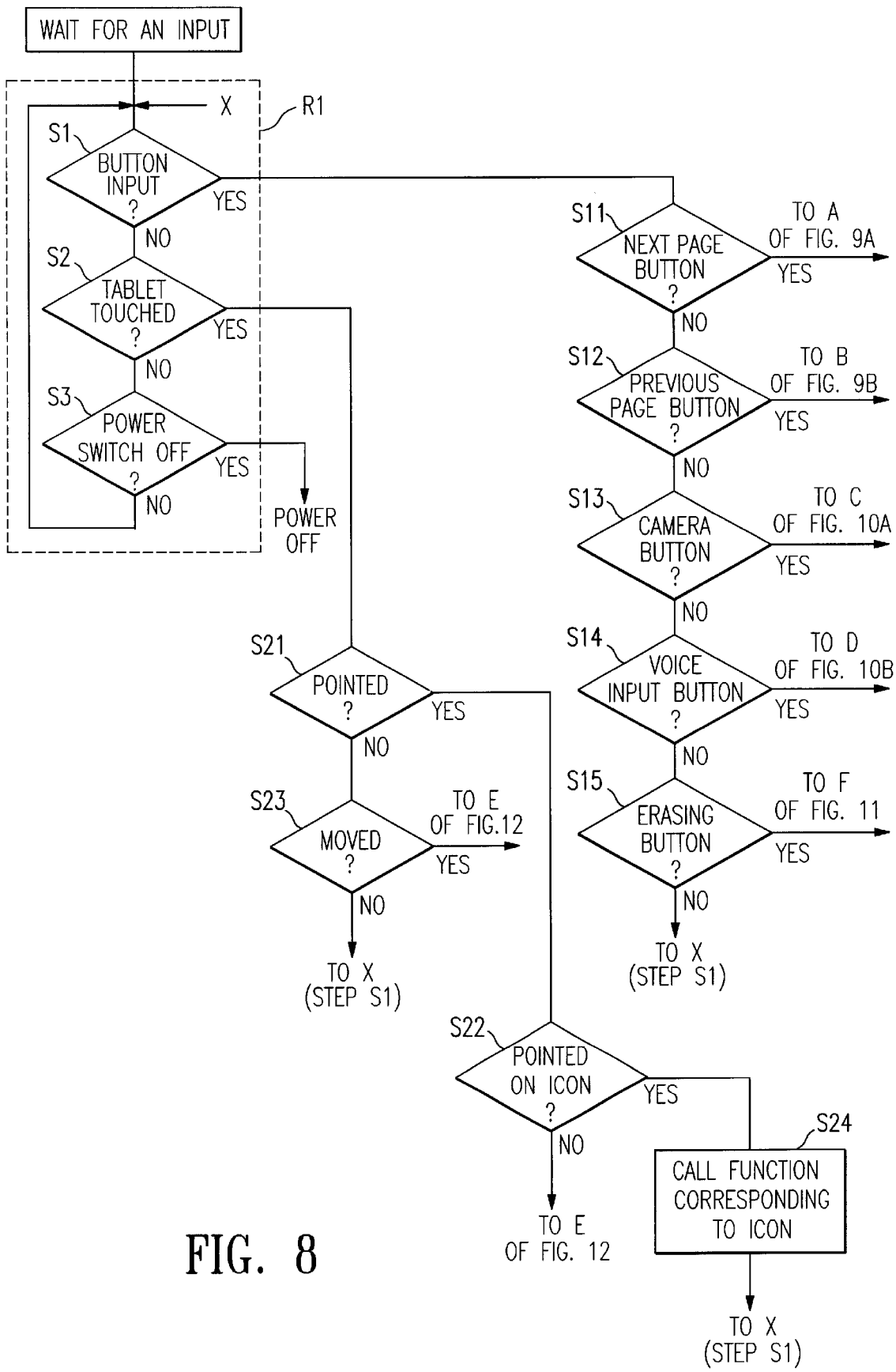
FIGS. 8, 9a, 9b, 10a, 10b, 11, 12 and 13 are flow charts showing data processing in accordance with several aspects of the present invention.

Referring to FIG. 8, reference designation RI denotes a process loop executed when the power switch 36 is turned on. In the process loop, a determination is made as to whether or not any of the various buttons (the next page button 37, the previous page button 38, the camera button 39, the recording button 40, the erasing buttons 44a and 44b and the like) is depressed (turned on) (step S1). When a button is not depressed, a determination is made as to whether or not the tablet is touched (step S2). When the tablet is not being touched, a determination is made as to whether or not the power switch 36 has been turned off (step S3). When the power switch 36 is not turned off, the process returns to step S1. In this manner, these steps in the loop are repeated. In other words, step S1 and step S2 are repeated while the power switch 36 is turned on.

When a determination is made in step S1 that there is an input from a button, a determination is made as to which one of the next page button 37, the previous page button 38, the camera button 39, the recording button 40, and an erasing button 44a, 44b is the button (steps S11–S15).

Figures 9A, 9B:
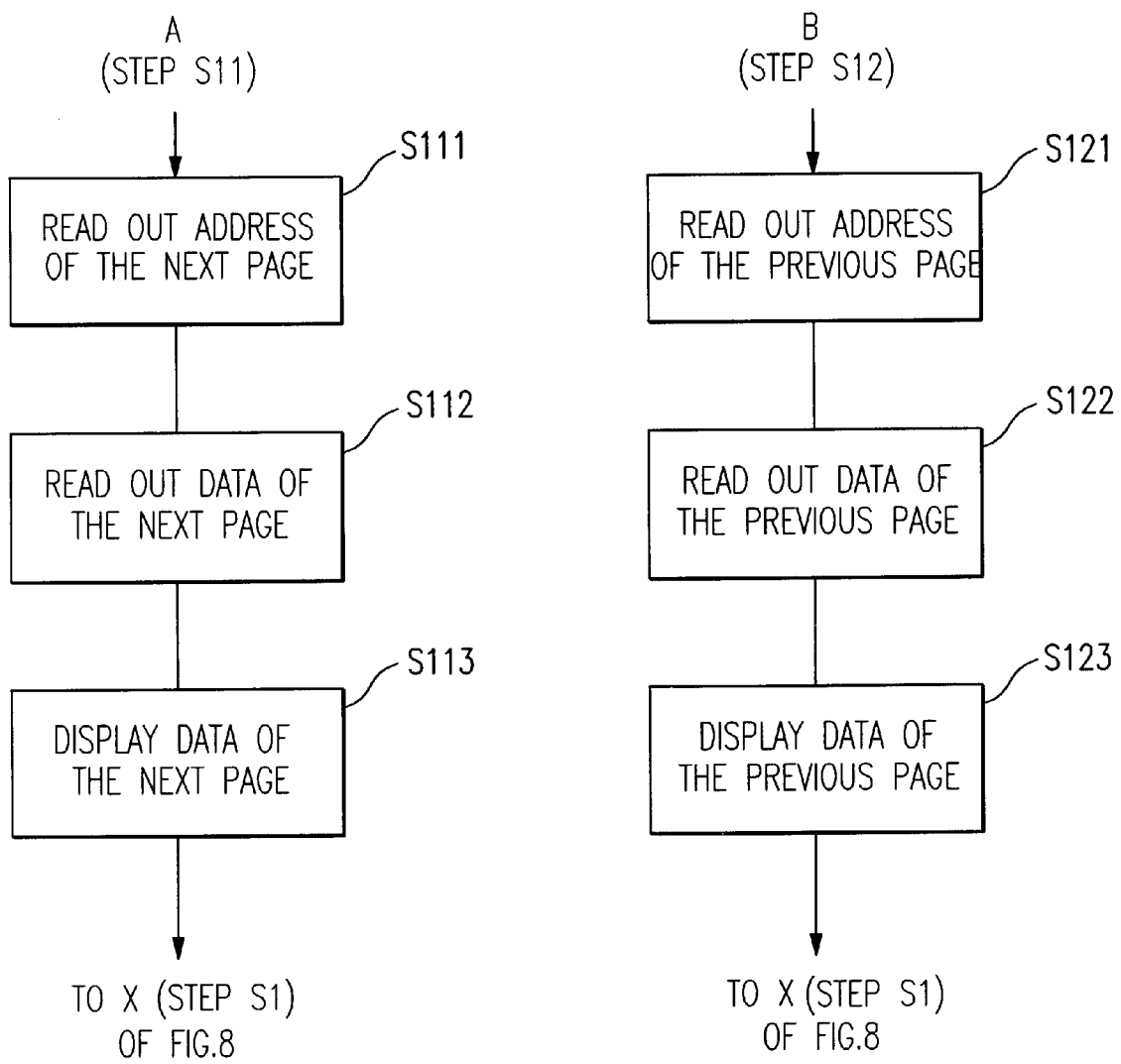

When the depressed button is the next page button 37, a process shown in FIG. 9a is executed. Namely, an address of the next page with respect to a page currently displayed is read out from the flash memory 33 (step S111), data inputted by the user (image data, ink data, voice data and the like) are read out from the specified addresses (step S113). In accordance with the embodiment shown in FIG. 4, assuming that the currently displayed page is the second page and the next page is the third page, the following process is executed. The head address of the third page (address B2) is read out from the data for the second page that is currently displayed. Next, based on addresses E0, E1 and E2, written at address B2, the corresponding respective data are read out (additional data is also read out from a region at address E3, if such additional data exists), and displayed on the display screen of the tablet 28, for example, in a manner shown in FIG. 3b. When the currently displayed page is the third page and, the next page is the fourth page, and when the fourth page does not record any data, the displayed fourth page contains no data. In the manner described above, when the next page button 37 is depressed, the data of the corresponding page is read out and displayed on the display screen of the tablet 28. Then, the process returns to step S1 and waits for the next operation.

When the depressed button is the previous page button 38, a process shown in FIG. 9b is executed. Namely, the address of the previous page is read out (step S121), and the data inputted by the user (image data, ink data, voice data and the like) are read our from the specified addresses of the flash memory 33 (step S122), and displayed on the display screen of the tablet 28 (step S123). In accordance with the embodiment shown in FIG. 4, assuming that the currently displayed page is the third page and the previous page is the second page, the following process is executed. The head address of the second page (address B1) is read out from the data for the third page that is currently displayed. Next, from data storage addresses D0, D1 and D2, written at address B1, the corresponding respective data are read out (additional data is also read out from address D3, if such additional data exists), and displayed on the display screen of the tablet 28, for example, in a manner shown in FIG. 3a. In the manner described above, when the previous page button 38 is depressed, the data of the corresponding page are read out and displayed on the display screen of the tablet 28. Then, the process returns to step S1 and waits for the next operation.

Figure 10A:
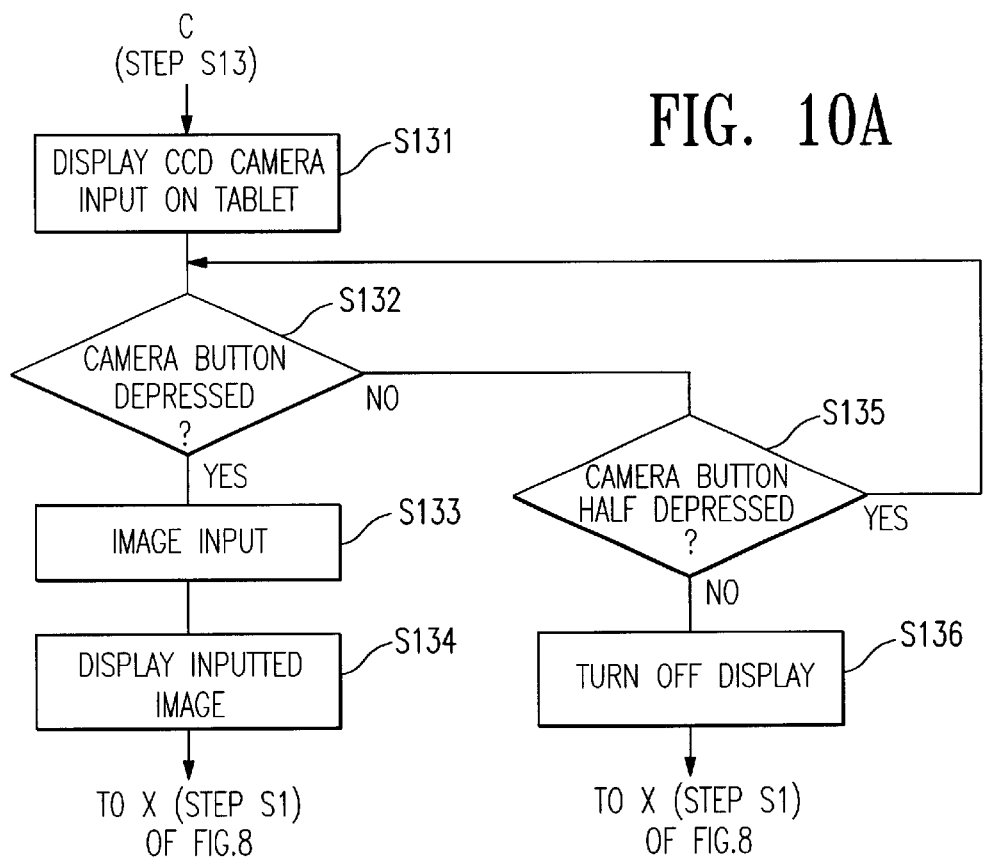

When the depressed button is the camera button 39, and when the camera button 39 is in a half-depressed state, an image inputted in the CCD camera 23 is displayed as a moving picture on the display screen of the tablet 28, as shown in the process of FIG. 10 (step S131). Next, a determination is made as to whether or not the camera button 39 is in the fully-depressed state (step S132). When a determination is made that the camera button 39 is in the fully-depressed state, an image at that moment is captured (step S133), and a still picture of the image is displayed on the display screen of the tablet 28 (step S134). The captured image is stored at a specified address of the corresponding page in the flash memory 33. Then, the process returns to step S1 shown in FIG. 8 and waits for the next operation. On the other hand, when a determination is made in step S132 that the camera button 39 is not fully depressed, a determination is made as to whether or not the camera button 39 is in the half-depressed state (step S135). When the camera button 39 is not in the half-depressed state, the camera button 39 is in an off-state and the image displaying is not performed (step S136). Thereafter, the process returns to step S1 shown in FIG. 8 and waits for the next operation. When a determination is made in step S135 that the camera button 39 is in the half-depressed state, the process returns to step 132.

Figure 10B:
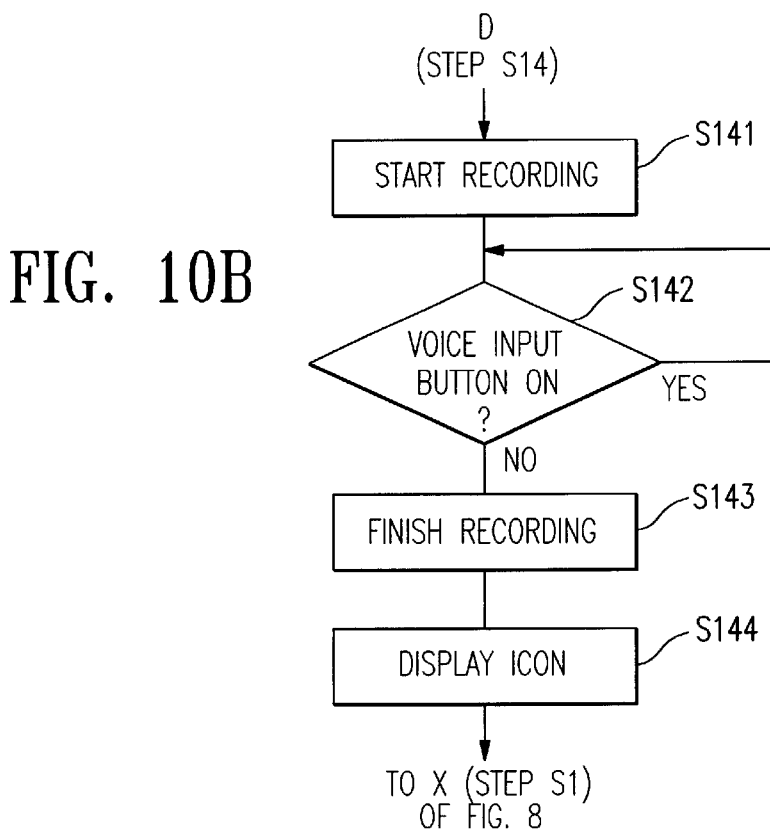

When the depressed button is the voice input button 40, as shown in the process of FIG. 10b, recording is started at the same time that the voice input button 40 is depressed (step S141). Then, a determination is made as to whether or not an on-state of the voice input button 40 is released (step S142). When the voice input button 40 remains in the on-state, the recording is continued. When the voice input button 40 is turned off, the recording is finished at that moment (step S143). Then, the icon 52 is displayed on the display screen of the tablet 28 to indicate that the voice is inputted as one of the data sets (step S144). The inputted voice data is stored at a specified address of the corresponding page in the flash memory 33. Thereafter, the process returns to step S1 shown in FIG. 8.

Figure 11:
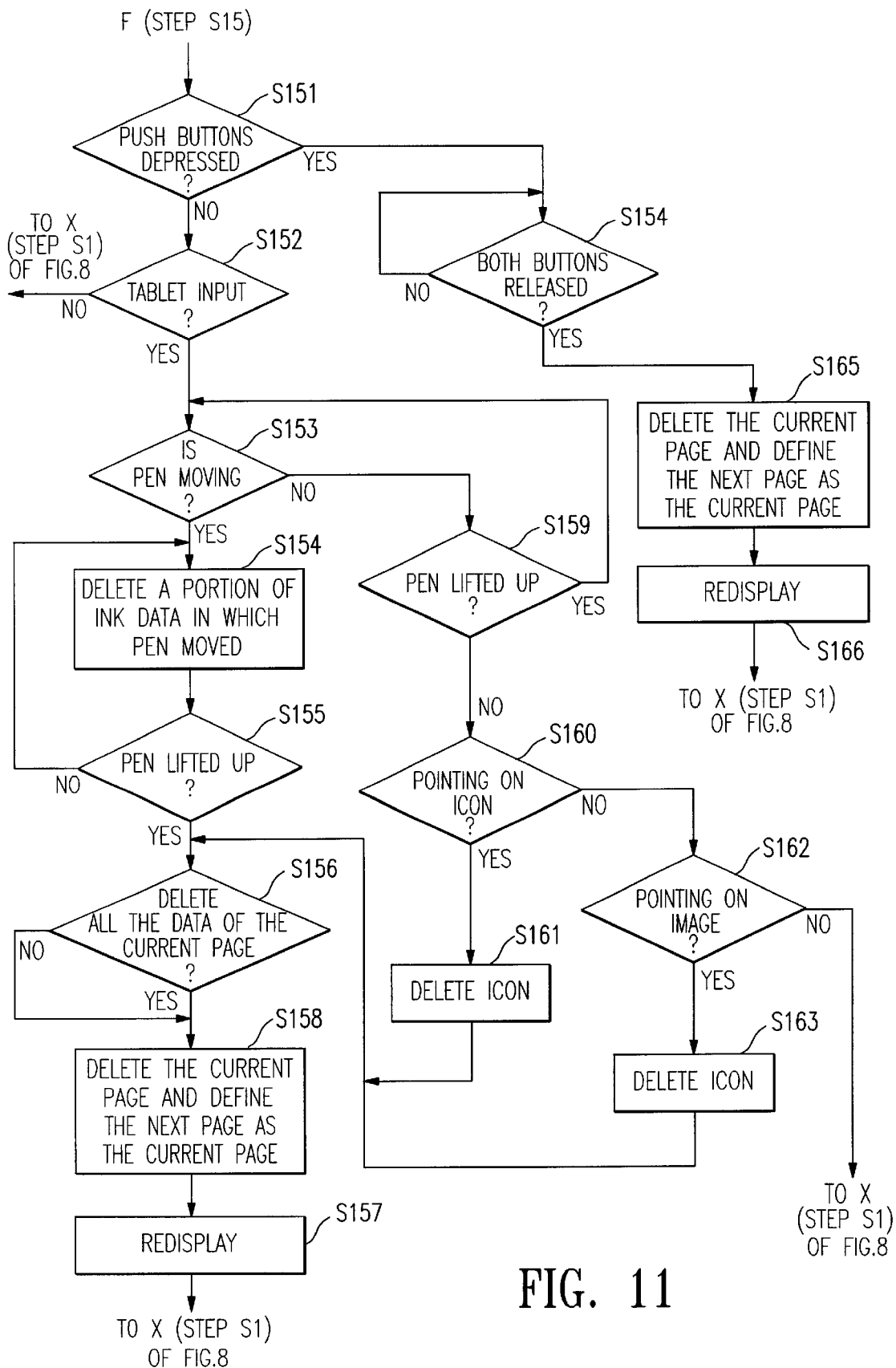

When the depressed button is an erasing button, the process shown in FIG. 11 is executed. Referring to FIG. 11, a determination is made as to whether or not both of the two erasing buttons 44a and 44b are depressed (step S151). When only one of the erasing buttons is depressed, a determination is made as to whether there is an input at the tablet (step S152). When there is no input at the tablet, the process returns to step 1 shown in FIG. 8. When there is an input at the tablet, a determination is made as to whether or not the pen is moving (step S153). When the pen is moving, an area of the ink data over which the pen has moved is erased (ste S154). Erasing of the ink data continues while the pen is being moved. When the pen is lifted up (step S155), a determination is made as to whether or not all the data of the corresponding page is erased (step S156). When not all the data is erased, the data other than the erased data is redisplayed (step S157). When a determination is made in step S156 that all the data is erased, the current page is erased, the next page is set as a current page (step S158), contents of the new current page are redisplayed, and the process returns to step S1 shown in FIG. 8

On the other hand, when a determination is made in step S153 that the pen is not moving, a determination is made as to whether or not the pen is lifted up (step S159). When the pen is not lifted up, a determination is made as to whether or not the pen is pointing at an icon (step S160). When the pen is pointing at an icon, the icon pointed by the pen is erased (step S161), and then the process proceeds to step S156.

When a determination is made in step S160 that the pen is not pointing at an icon, a determination is made as to whether or not the pen is pointing at an image (step S162). When an image is not pointed at by the pen, the process returns to step S1 shown in FIG. 8. When an image is being pointed at by the pen, that image is erased (step S163), and then the process proceeds to step S156.

The above-described process is executed when the determination in step S151 indicates that only one of the erasing buttons is depressed. When both of the erasing buttons 44a and 44b are depressed, steps from step S164 on are executed. In other words, when both of the erasing buttons 44a and 44b are released from the depressed state (step S164), the currently displayed page is erased, and the next page is set as the current page (step S165). Then, contents in the new current page are redisplayed (step S166).

As indicated above, for erasing a part of the page data, the pen is pointed to the part to be erased or the pen is moved over the part while one of the erasing buttons is depressed. As a result, data corresponding to the part to which the pen is pointed or the part over which the pen is moved is erased. When both of the erasing buttons are depressed, the current page is erased when the depressed state is released. As described above, when a part of data is erased, the pen is pointed to the part or the pen is moved over the part. For convenience of both of right-handed users and left-handed users, the erasing buttons 44a and 44b are disposed adjacent the right and left side edges of the apparatus, respectively, so that the pen can be operated while either of the erasing buttons is depressed.

When a determination is made in the process loop R1 of FIG. 8 that the tablet is being touched by the input pen 51 (step S2), then a determination is made as to whether or not the operation by the input pen 51 is a pointing operation (step S21). When it is a pointing operation, a determination is made as to whether or not the pen is pointed to a displayed icon 52 (step S22). When the pen is pointed to the icon 52, a function corresponding to the icon is retrieved (step S24). On the other hand, when a determination is made in step S21 that it is not a pointing operation, a determination is made as to whether or not the operation by the input pen 51 is a shifting, or moving, operation (step S23). When the operation by the pen is a shifting operation, the operation is determined as an operation to input characters or lines, and then the process proceeds to steps shown in FIG. 12.

Figure 12:
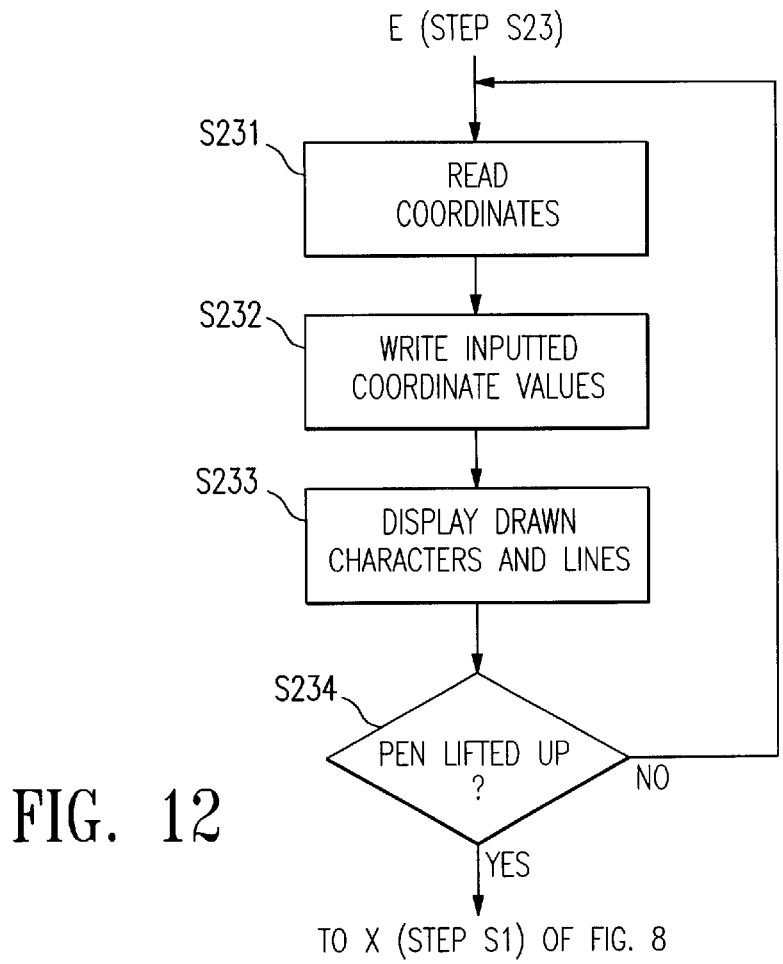
Figure 13:
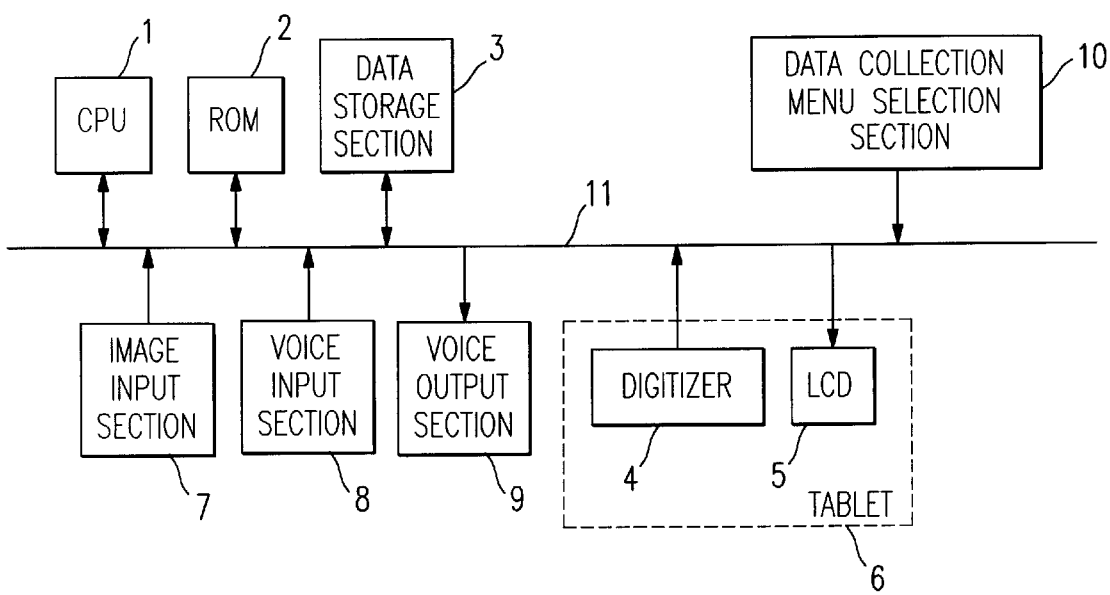

As shown in FIG. 12, coordinates of the inputted characters or lines are read in, and values of the coordinates are written in the flash memory 33 at a specified address of the corresponding page (step S231 and step S232). Then the drawn characters or lines are displayed on the display screen of the tablet 28 (step S233). These steps are continued until the input pen 51 is lifted up from the display screen of the tablet 28. When the input pen 51 is lifted up from the display screen of the tablet 28 (step S234), the process returns to step S1 shown in FIG. 8 and waits for the next operation. When a determination is made in step S22 that the input pen 51 is not pointed at an icon, the process proceeds to step S231 of FIG. 12.

To read out the data in each of the pages, the power switch 36 is turned on, in much the same way as a conventional electronic notebook, and then data of a page in which the last data input was performed is displayed. When a user wants to read out data in another page, a page changing button (the next page button 37 or the previous page button 38) is operated. As a result, contents to be displayed are successively changed page by page and read out. In addition to this data read out method in which pages are successively changed until a desired page appears, data can be read out by a variety of different methods. For example, a page designation button is provided to designate and read out a desired page, desired data is read out based on a key word provided in each page, or the like.

A process program that executes the above-described process of the present invention may be stored in a storage medium, such as, for example, a floppy disc, a photo-disc, a hard disc and the like. The present invention encompasses these storage media. Alternatively, the process program may be obtained via a network.

In the above embodiment, the electronic memo pad that implements the present invention can be used in a meeting. In alternative embodiments, while a user is on a trip, an image of a mountain may be captured, and data for the height and the name of the mountain are inputted by an input pen. The user can also vocally input his impression about the surrounding landscape. In this manner, the electronic memo pad has a substantially wide range of utilities. Moreover, a plurality of different kinds of data, such as, for example, image data, voice data and pen input data can be inputted as a group of data sets in each page, without changing the input mode, without the user's awareness of the mode changes, and optionally, as ideas flow out from the user's mind. As a result, the memo pad is substantially user-friendly and has a variety of utilities in wide areas.

In the above-described embodiments, the inputted data includes image data, pen input data and voice data. Further, the additional data includes data for the current date and time. However, in addition to the data for the current date and time, meteorological data including data for the temperature and the atmospheric pressure may be inputted as additional data. Also, not only voices produced by human beings but also musical sounds and sounds in nature can be inputted as sound data. Furthermore, not only a still picture but also a moving picture may be stored as image data.

Moreover, the external equipment connecting section 42 shown in FIG. 1 may be connected to a personal computer or the like so that data inputted in the electronic memo pad can be transferred to the personal computer and the data can be edited (for example, a content of one page may be added to a content of another page) on the personal computer.

In the above-described embodiments, the present invention is implemented in a portable type data collection apparatus such as an electronic memo pad. However, the present invention is not limited to the portable type data collection apparatus, but is widely applicable to data processing apparatuses.

Also, in the above-described embodiments, the entire display area on a display screen is considered to represent one page. However, the present invention is not limited to this particular embodiment. For example, the present invention is also applicable where a window opened in a display screen may be considered to represent one page.

As described above, in accordance with the present invention, data input devices include not only an input device for inputting characters or lines, but also an image input device and a sound input device. As a result, image data and sound data can be inputted in addition to ink data. Moreover, a variety of data sets including ink data, image data and sound data inputted in a page are treated as associated with the page. When these data sets are written in a display storage device (VRAM) as data for that page, a writing order is set based on the types of the inputted data sets. These data sets are written in a layered structure in which data that is set later in the writing order is written over data that has already been written. As a result, when these data sets are inputted, a mode change is not required each time a different type of data is inputted, and the data is easily collected in any order as the user desires. The ink data, the image data and the voice data (in the form of an icon) are visually presented in the unit of one page on one display screen.

Furthermore, in accordance with the present invention, an erasing device is provided to erase inputted data. In one embodiment, two erasing devices are provided. When one of them is operated, only a part of the data displayed on the display screen is erased. When both of them are operated, all of the data associated with the current page are erased. As a result, when erasing data that is displayed as page data, a selected portion of the page or the entire page can be erased by a relatively simple operation. In particular, when a part of the page data is erased, the part may be touched by a pen, or the pen is moved over the part. As a result, data can be erased as though a memo written by a pencil is erased by a rubber eraser, and therefore the electronic memo pad has a substantially improved user-friendliness.

This application relates to subject matter disclosed in Japanese Application number 8-164997, filed on Jun. 25, 1996, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A data processing apparatus for collecting and displaying inputted data and storing the inputted data, the data processing apparatus comprising:

data input devices each optionally inputting a respective one of a plurality of different kinds of data;

a data storage device coupled to the data input devices to store data to be displayed in a common display area of a display screen as mutually associated data at designated addresses when the data are optionally inputted;

a display storage device coupled to the data storage device to store the data stored in the data storage device as display data to be displayed in the display area;

an erasing device that erases the inputted data; and a control device coupled to control the data input devices, the data storage device, the display storage device and the erasing device, wherein when the plurality of the associated different kinds of data stored in the data storage device are written in the display storage device as one screen of display data, the control device sets a writing order for the different kinds of inputted data, and the control device successively stores the different kinds of data in the display storage device according to the order and displays the different kinds of data in the display area, and when inputted data is to be erased, the erasing device is operated so that only the desired kind of inputted data displayed in the common display area is erased.

2. A data processing apparatus as defined in claim 1, wherein two erasing devices are provided, and wherein when one of the erasing devices is operated, only a designated one of the inputted data to be displayed on the common display area is erased, and when both of the erasing devices are operated, all of the inputted data to be displayed on the common display area are erased.

3. A data processing method for collecting and displaying inputted data and storing the inputted data, the data processing method comprising the steps of:

storing data optionally inputted to be displayed in a common display area on a display screen as mutually associated data in designated addresses in a data storage device;

writing in a display storage device the plurality of the associated different kinds of data in the data storage device as one screen of display data to be displayed in the common display area, wherein when writing the data in the display storage device, a writing order is set for writing in the display storage device the associated data stored in the data storage device, and the associated data are successively stored in the display storage device according to the writing order and displayed in the display area; and providing an erasing device for erasing the inputted data, wherein when the data is erased, the erasing device is operated so that only the desired kind of inputted data displayed on the common display area is erased.

4. A data processing method as defined in claim 3, wherein two erasing devices are provided, and wherein when one of the erasing devices is operated, only a designated one of the inputted data to be displayed on the common display area is erased, and when both of the erasing devices are operated, all of the inputted data to be displayed on the common display are erased.

* * * * *